(12) United States Patent
Koeckert et al.

(10) Patent No.: US 8,377,578 B2
(45) Date of Patent: Feb. 19, 2013

(54) INFRARED REFLECTING LAYER SYSTEM FOR TRANSPARENT SUBSTRATE

(75) Inventors: Christoph Koeckert, Radebeul (DE); Holger Proehl, Dresden (DE); Falk Milde, Dresden (DE)

(73) Assignee: Von Ardenne Anlagentechnik GmbH, Dresden (DE)

( * ) Notice: Subject to any disclaimer, the term of this patent is extended or adjusted under 35 U.S.C. 154(b) by 0 days.

(21) Appl. No.: 13/349,007

(22) Filed: Jan. 12, 2012

(65) Prior Publication Data
US 2012/0171441 A1    Jul. 5, 2012

Related U.S. Application Data

(62) Division of application No. 11/749,900, filed on May 17, 2005, now Pat. No. 8,119,194.

(30) Foreign Application Priority Data

May 23, 2006   (DE) .......................... 10 2006 024 524

(51) Int. Cl.
    *B32B 15/04* (2006.01)
(52) U.S. Cl. ........ 428/701; 428/428; 428/432; 428/688; 428/699; 428/702; 428/704
(58) Field of Classification Search .................. 428/428, 428/432, 688, 699, 701, 702, 704
    See application file for complete search history.

(56) References Cited

U.S. PATENT DOCUMENTS

| | | | |
|---|---|---|---|
| 5,962,115 A | 10/1999 | Zmelty et al. | |
| 6,495,251 B1 * | 12/2002 | Arab et al. | 428/336 |
| 6,586,102 B1 * | 7/2003 | Stachowiak | 428/432 |
| 6,589,658 B1 * | 7/2003 | Stachowiak | 428/432 |
| 6,838,179 B1 | 1/2005 | Legrand | |
| 2002/0136905 A1 * | 9/2002 | Medwick et al. | 428/432 |
| 2003/0198816 A1 * | 10/2003 | Lingle et al. | 428/432 |
| 2003/0235719 A1 * | 12/2003 | Grimal et al. | 428/698 |
| 2004/0005467 A1 | 1/2004 | Neuman et al. | |
| 2004/0086723 A1 * | 5/2004 | Thomsen et al. | 428/426 |
| 2004/0241457 A1 * | 12/2004 | Macquart et al. | 428/432 |
| 2005/0164012 A1 * | 7/2005 | Carson et al. | 428/432 |
| 2006/0121290 A1 | 6/2006 | Chonlamaitri et al. | |
| 2006/0246300 A1 | 11/2006 | Hevesi | |
| 2008/0038457 A1 * | 2/2008 | Carson et al. | 427/163.1 |

FOREIGN PATENT DOCUMENTS

| | | |
|---|---|---|
| CA | 2 534 656 A1 | 2/2005 |
| DE | 196 40 800 | 4/1998 |
| DE | 60007356 T2 | 10/2004 |
| EP | 1 446 364 B1 | 8/2004 |
| WO | 2005/012200 | 2/2005 |
| WO | 2006/048462 | 5/2006 |

* cited by examiner

*Primary Examiner* — Jennifer McNeil
*Assistant Examiner* — Lauren Colgan
(74) *Attorney, Agent, or Firm* — Heslin Rothenberg Farley & Mesiti P.C.

(57) ABSTRACT

An infrared radiation reflecting transparent layer system on a transparent substrate and a method for producing same is provided. The infrared radiation reflecting layer system comprises an infrared radiation reflecting layer sequence which includes a selective function usually consisting of a noble metal, mostly silver, or an alloy thereof and having a good selective reflectivity in the infrared range. The layer sequence is supplemented by at least one transparent dielectric layer of an oxynitride of a metal, a semiconductor or a semiconductor alloy having a low to moderate refractive index arranged directly on the substrate or above the infrared radiation reflecting layer sequence.

18 Claims, 1 Drawing Sheet

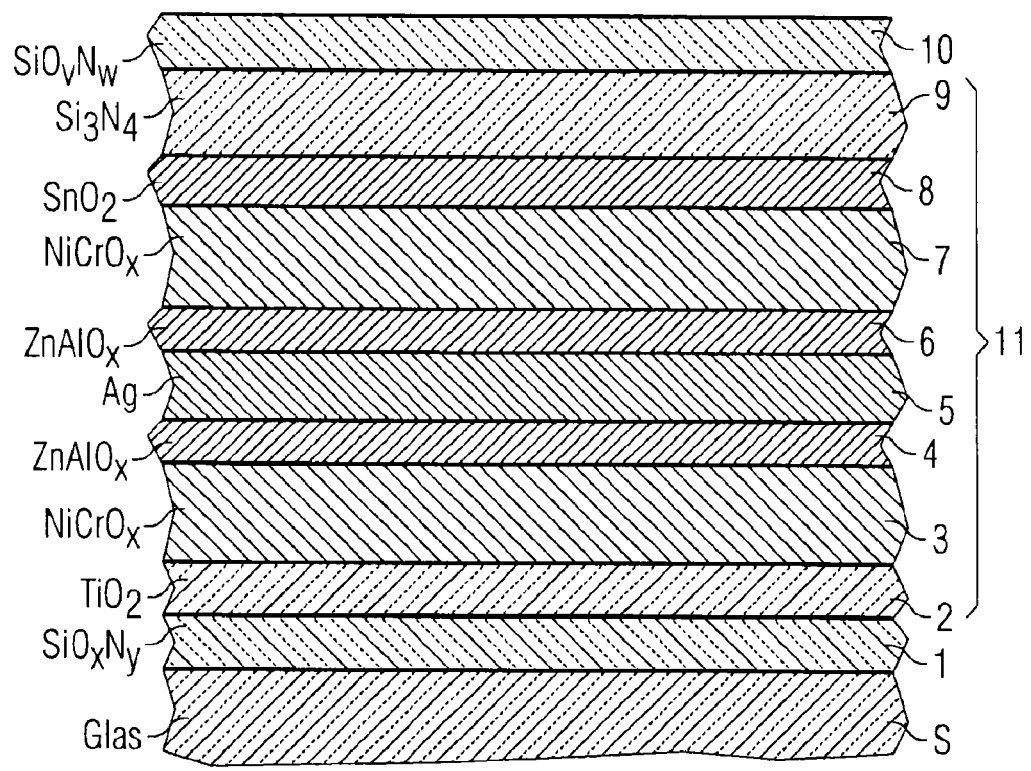

INFRARED REFLECTING LAYER SYSTEM FOR TRANSPARENT SUBSTRATE

CROSS-REFERENCE TO RELATED APPLICATIONS

The instant application is a divisional application of U.S. patent application Ser. No. 11/749,900 May 17, 2007 (now U.S. Pat. No. 8,119,194), which claims the benefit of prior German Patent Application No. DE 10 2006 024 524.5 filed on May 23, 2006. Both applications are incorporated herein by reference.

BACKGROUND OF THE INVENTION

The present invention relates to an infrared radiation reflecting layer system on a transparent substrate having a sequence of layers that are applied to the substrate and reflect infrared radiation. The sequence of layers includes at least one selective function layer.

The invention also relates to a method for manufacturing such a layer system in which an infrared radiation reflecting layer sequence is applied to a transparent substrate by a suitable method.

In general, an infrared radiation reflecting layer system (low-E layer system) comprises the function layer, a base layer that improves adhesion of the function layer and a reflection reducing top layer, whereby the individual layers may repeat within the layer system. The function layer, usually consisting of a noble metal, mostly silver, or an alloy thereof, has a good selective reflectivity in the infrared range even with a small layer thickness. If only one function layer is arranged in the layer system, this is often referred to as a "single low-E" system.

The top layer also serves to improve the mechanical and chemical stability, in addition to reducing reflection. It is usually made of a highly refractive dielectric material containing silicon. To increase the transmittance of the layer system in the visible range, these reflection-reducing layers are arranged above and beneath the selective function layer.

Such infrared radiation reflecting transparent layer systems are also subjected to tempering processes to harden and/or shape the substrate. In this case they have a layer sequence having layer properties such that a substrate having this layer system may be subjected to a heat treatment and any changes that occur in the optical, mechanical and chemical properties of the layer system may be kept within defined limits. Depending on the application of a coated substrate, its layer system is exposed to different climate conditions in different time regimens during the tempering process.

Because of different thermal loads to which the layer sequences already applied are subjected, various processes that alter the reflectivity of the function layer and the transmittance of the layer system occur in the course of production of the following layers of the layer system and the tempering process, in particular diffusion of components of the reflection reducing layer into the function layer and vice versa. To prevent such diffusion processes, a blocking layer that serves as a buffer for the diffusing components is inserted between the reflection-reducing layer and the function layer. These blocking layers are structured and arranged according to the thermal burden that occurs and protect the sensitive function layer, which is often very thin or the function layers from the influence of neighboring layers. In particular shifts in color of the layer system and an increase in surface resistance of the layer system due to the tempering process are prevented by the introduction of one or more blocking layers.

In particular NiCr or $NiCrO_x$ layers are known as blocking layers for temporable layer systems. For example DE 035 43 178 and EP 1 174 379 describe blocking layers which include silver layer(s) or at least protect them on one side. However, the blocking layers cause a reduction in conductivity of the silver layer(s). If a silver layer with a surface resistance of approx. 5 ohm/sq. [sic] is deposited and embedded in two $NiCrO_x$ layers, this embedding may lead to an increase in the surface resistance by approx. 1.5 ohm/sq. to 6.5 ohm/sq. [sic].

EP 0 999 192 B1 describes a layer system including a silver layer as a selective function layer which is provided with a blocking layer of nickel or nickel chromium on both sides. By introducing an $NiCrO_x$ layer into the functional silver layer in a single low E system, the layer system is stabilized in the heat treatment. The disadvantage is that with this layer system, each individual layer of the two silver partial layers must be approximately 7 to 8 nm thick to prevent the formation of islands with the silver partial layers. This in turn leads to a low transmittance of the layer system. Furthermore, EP 0 999 192 B1 discloses the use of a substoichiometric $TiO_x$ layer between the blocking layer and the silver layer, which should reduce the so-called haze formation, i.e., the change in optical properties of the function layer due to diffusion processes into the function layer. However, this absorbent $TiO_x$ layer undergoes oxidation during the heat treatment, resulting in significant changes in the transmittance and a shift in the preset color locus.

EP 1 238 950 A2 discloses a temperable layer system that is provided with $NiCrO_x$ layers as blocking layers on both sides of a silver layer as the sensitive layer.

Furthermore, dielectric interface layers are provided in this layer system and are situated above and below the blocking layers. Such layers have various stabilizing effects on the layer system and also act as a diffusion barrier during the tempering processes.

Furthermore, EP 1 238 950 describes the use of gradient layers in stabilization of heat-treatable layer systems. The disadvantage here is that the $SiN_x$ layer is beneath the blocking layer so that the electric surface resistance and thus the emissivity of the layer system are not reduced. In this approach, several layer sequences of sensitive silver layers with underlayers and two blocking layers enclosing the respective silver layer are provided.

DE 100 46 810 also discloses the application of metallic blocking layers which form a gradient layer with the silver as the function layer in a transitional area between the two layers. The reflection-reducing layer may also consist of several metal oxide layers with a gradient layer consisting of two neighboring individual layers between them.

The use of metal oxides for the reflection reducing layer does not constitute an optimal approach so the reflection reducing layer in DE 101 31 932 consists of several individual layers of different metal nitrides, whereby the amount of material in a layer is reduced from initially 100% to 0% and the amount of material in the neighboring individual layer is increased from 0% to 100% to the same extent. However, it has been found that this layer system also fails to ensure the desired transmittance.

It has been found that these different layer structures are still too sensitive for climate changes and only special tempering processes are suitable despite the various measures employed, so that they cannot be manufactured in a satisfactory quality or yield when there are demanding or definitely different climate conditions.

These layer systems have quality problems in production, even in the case of raw glass in undefined starting states, i.e., a fluctuating chemical composition of the glass, in particular with regard to its sodium content. Furthermore, other glass influences such as corrosion or impressions of the section devices that are used in handling the glass and are often not detectable by visual inspections and cannot be eliminated by the usual cleaning operations, cause unwanted changes in the properties of the layer system. With such glass influences, it is a particular disadvantage that their effects on the properties of the layer system become visible only after the tempering process.

SUMMARY OF THE INVENTION

Therefore an object of the present invention is to provide a layer system and a method of producing same that will ensure an adequate quality and in particular a high transmittance in the visible range as well as a low emissivity while at the same time permitting extensive stability of the color locus of the layer system under demanding climate conditions of heat treatment of the substrate and/or undefined states in the case of the glass substrate.

BRIEF DESCRIPTION OF THE DRAWINGS

FIG. 1 depicts a layer system that is in accordance with one embodiment of the invention.

DETAILED DESCRIPTION OF THE INVENTION

A supplementary underlayer of an oxynitride of a metal, a semiconductor or a semiconductor alloy applied directly to the substrate in a conventional layer sequence which is already reflective for infrared radiation acts as a barrier layer with respect to the substrate by preventing diffusion processes from the substrate into the layer sequence and thus the resulting influences on the layer properties.

When the substrate is glass, this pertains in particular to the diffusion of sodium ions which may be present in different concentrations according to the composition of the glass, so that because of these fluctuations, deviations in the color locus may occur with a layer system and with process conditions that are otherwise the same after a process that involves the input of heat and therefore triggers diffusion. In addition, the effects of corrosion of the substrate or traces [of substances] on the substrate that have been formed in previous process sequences in supplying the substrate, e.g., suction device impressions on glass are suppressed. Effects on the heat-treated layer system arising from these changes in surface conditions of the substrate and chemical residues on the substrate can be suppressed with an inventive underlayer to the extent that a color variance remains below a visible limit value.

Since the unwanted diffusion processes due to the input of heat into layers already deposited may take place, the advantages described here can also be achieved with layer systems that are not to be tempered when using the inventive underlayer.

With the material used here, it is possible that any known low E or temperable low E layer sequence may be used as the infrared radiation reflecting layer sequence, e.g., a layer sequence from the state of the art as described in the introduction. The layer sequence may thus include one or more selective function layers with blocking layers incorporated or embedded in them and additional interface layers as well as reflection reducing layers formed as a gradient.

Another object of the inventive underlayer is that with the deposition of this supplementary barrier layer, the water entrained by the glass substrate into the coating system can be removed from the substrate without this operation having any effect on the reflective layer sequence. In addition to suitability as a barrier layer, the material of the inventive underlayer has proven to be much less sensitive to water than the materials generally used as an underlayer, e.g., titanium oxide ($TiO_2$). In addition, such an oxynitride has also proven to be insensitive in the deposition process, so that the layer properties can also be adjusted reliably and reproducibly even when there are fluctuating boundary conditions in the manufacturing process.

An effect that is achieved by introducing the barrier layer, consisting of a dielectric material having a low to moderate refraction according to this invention, between the substrate and the layer sequence that reflects infrared radiation is that the optical effect of the inventive underlayer is minimized so that the transmittance of the layer sequence and thus its color locus are subject to little or no change as a result of the supplementary layer. A layer of low to moderate refraction here is understood to be a layer having a refractive index such that it is in the lower range in comparison with the refractive indices of the materials used in the conventional layer systems that reflect infrared radiation and thus is near the substrate [sic; is near that of the substrate]. A refractive index of stoichiometric silicon oxide is known to be approximately 1.46, which is regarded as being a low refractive index, while that of silicon nitride is approximately 2.05, which is a high refractive index in comparison with that of materials used for these layer systems. These refractive indices as well as those given below are always based on the main wavelength of visible light, which is 550 nm.

According to an embodiment, the refractive index is approximately equal to or slightly greater than that of the substrate. When the substrate is float glass which has a refractive index of approximately 1.52, the refractive index of said inventive underlayer may be 1.50 to 1.85. In another embodiment the refractive index of said underlayer is in the range of 1.60 to 1.75. In other embodiments, the refractive index of this layer is in the range of 1.50 to 1.60 or in the range of 1.75 to 1.85. In either case the refractive index of an oxynitride of a metal, semiconductor or semiconductor alloy can be adjusted very well through the oxygen and/or nitrogen content.

An object of the invention is also achieved by another inventive layer which concludes the layer system toward the top (as seen from the substrate upward) and consists of a dielectric material having a low to moderate refractive index. This top second layer of dielectric material which has a low to moderate refractive index and, like the bottom layer, consists of an oxynitride of a metal, semiconductor or semiconductor alloy, forms a protective layer for the tempering process.

By means of the adjusted oxygen content, the oxidation of the uppermost layers of said top layer, which takes places during a tempering process or during the course of use, is reduced and thus color drift is reduced and the transmittance of the layer system is increased so that the mechanical and chemical protection of the layer system is ensured due to the oxygen content of the top layer.

The uppermost layer of a layer sequence that reflects IR radiation is usually a layer of a highly refractive dielectric material that serves as a reflection reducing layer of the layer sequence to improve the transmittance in the visible range and at the same time serves as a top layer of the layer sequence to improve its chemical and mechanical stability. Because of these functions, it usually consists of silicon nitride. In contrast with that, the inventive top layer of the layer system consists of a material having a low to moderate refractive index and also containing in addition to a nitrogen component, an adjustable oxygen content. Here again, the possibility of oxynitride is utilized, namely that the refractive index is adjustable, e.g. in a range of 1.50 to 1.95, but here in order to achieve an optical effect, namely optimization of the reflection reducing function in conjunction with the layers beneath. In some embodiments the refractive index of this second dielectric layer having a low to moderate refractive index has a value between 1.50 and 1.60 or between 1.85 and 1.95. In another embodiment, the refractive index of this second dielectric layers amounts between 1.60 and 1.85.

It is also possible to combine the inventive underlayer and the inventive top layer in a layer system because of the low or advantageous optical effect of the layers that supplement the layer sequence and because the two layers do not influence one another mutually.

According to the functions described for the first and second dielectric layers having a medium to low refractive index, they are made of an oxynitride of a metal, a semiconductor or a semiconductor alloy. Because of the known properties and the tested manufacturing processes, the inventive underlayer and/or top layer preferably consist of silicon oxynitride. However, oxynitrides of other materials or material compositions may also be considered if the respective refractive index is adjustable and at the same the respective oxygen and nitrogen content of the two layers are adjustable.

Depending on the mechanical, chemical and optical requirements and depending on the design of the layer sequences that reflects infrared radiation, the first and second layers which have a low to moderate refractive index may be made of the same or different materials having comparable or different oxygen and/or nitrogen contents or materials having approximately the same or different refractive indices.

The starting point for the choice of materials, the optical properties and the stoichiometric ratios of the two supplementary layers to be adjusted is always their function as described above and the design of the infrared radiation reflecting layer sequence, whereby optical properties and stoichiometric ratio may also differ from one another when using starting materials that are otherwise the same.

According to an embodiment of the present invention, admixtures of other components in one or both supplementary layers, which may be necessary for reasons based on the process engineering or in order to achieve special properties, are also possible. An example that can be mentioned here is aluminum admixtures, usually in the range between 8% and 15% or even more or less, or boron doping in the coating source which serves to increase the efficacy of layer deposition.

The aforementioned properties of the inventive underlayer and top layer can be achieved with the usual layer thicknesses of such systems in the range of a few tenths of nanometer, but lower demands are made of the thickness of the underlayer to ensure its barrier function due to the minimized optical influence. Therefore, its optical thickness, which is the product of the layer thickness and the refractive index, is intended to be in a relatively large range according to an embodiment of the invention, namely less than one-eighth of the main wavelength of the spectral range for which the layer system should have the best transparency. For visible light the wavelength is known to be 550 nm.

To increase the efficacy of the barrier function of the first dielectric layer having a medium to low refractive index, according to an embodiment of the invention, this layer is deposited as a gradient layer with an oxygen or nitrogen content that decreases toward the function layer. As an alternative or in addition to this or other gradient layers deposited in the layer sequence, the second dielectric layer which has a low to moderate refractive index and concludes the layer system may be deposited as a gradient layer with an oxygen or nitrogen content that decreases in the direction of the function layer. This embodiment makes it possible to further improve the overall properties of the layer system.

In this way it is possible to produce a refractive index that changes with an increase in distance from the layer surface within the supplementary top layer of the system so that the same stabilizing and reflection reducing effect is achieved as allowed by the sequence of a highly refractive reflection reducing layer with a top layer arranged above having a low to moderate refractive index, so that the manufacturing expense for the layer system can be reduced.

Since both the first and second dielectric layers having a low to moderate refractive index essentially have little or no influence on the reflection of infrared radiation of the adjacent layer sequence, i.e., should be added supplementarily, the layer sequence has all the individual layers that are needed for the desired reflection and transmittance. Therefore, according to other embodiments, the first dielectric layer having a low to moderate refractive index is followed by a first dielectric layer having a high refractive index and a second dielectric layer having a high refractive index is arranged beneath the second dielectric layer having a low to moderate refractive index, whereby the refractive index of the first and/or second dielectric layers having a high refractive index has a value between 1.9 and 2.6 at 550 nm. In other embodiments the refractive index of this first and/or second dielectric layers has a value between 1.9 and 2.0 or between 2.5 and 2.6. In another embodiment, the refractive index of this first and/or second dielectric layers amounts between 2.0 and 2.5.

Likewise, according to other embodiments, as an alternative or in addition, the layer sequence may also have one or more blocking layers optionally also designed as gradient layers or other dielectric interface layers that stabilize the layer system.

To manufacture the inventive layer system, the first dielectric layer having a low to moderate refractive index is deposited by a suitable coating method directly on the substrate, then the infrared radiation reflecting layer sequence and optionally as an alternative or in addition to the first layer, the second dielectric layer having a low to moderate refractive index is also deposited.

A suitable method for manufacturing one or more to all layers would be direct current (DC) magnetron sputtering or moderate frequency (MF) magnetron sputtering, wherein the oxynitrides, oxides and/or nitrides are applied by reactive coating from a metallic or semiconducting coating source as well as in a nonreactive or partially reactive coating process from such a coating source consisting of the stoichiometric or substoichiometric oxide or nitride of the layer material.

In another embodiment the first or second dielectric layer or the first and second dielectric layers having a low to moderate refractive index are applied by a chemical vapor deposition process (CVD) or a plasma supported CVD process. This layer thickness which can be produced inaccurately by these methods is accepted because in the case of these two layers it has little or no influence on the infrared radiation reflecting property of the layer system. Instead, however, layers produced by this chemical method have especially good barrier properties and thus have locus and transmittance stabilizing properties.

Like the fluctuations in layer thickness, admixtures in the material are harmless for the manufacturing process for the two supplementary layers. For the production of certain geometries of coating sources, e.g., of tubular cathodes, for example, or to increase the electric conductivity of the coating material, it is possible to add aluminum with admixtures of much less than 20% or to perform boron doping. Other admixtures for other purposes are also possible.

The present invention will now be explained in greater detail on the basis of one exemplary embodiment shown in the figure. The respective drawing shows in the figure an inventive layer system on a substrate of float glass. The individual layers of the layer system described below are arranged one above the other starting from the glass substrate.

The first dielectric layer 1 having a low to moderate refractive index and consisting of substoichiometric silicon oxynitride ($SiO_xN_y$) is arranged directly on the substrate S made of float glass. It functions as a barrier layer for diffusing sodium ions of the glass into the layer system and at the same time has adhesive properties for the subsequent layer.

This is followed by the first highly refractive dielectric layer 2 which also serves as an adhesive and at the same time improves the mechanical and chemical properties of the system as a whole. In the exemplary embodiment described here, it consists of $TiO_2$.

The first blocking layer 3 applied thereto consists of substoichiometric $NiCrO_x$. This is followed by the first interface layer 4 of substoichiometric zinc aluminum oxide (hereinafter referred to as $ZnAlO_x$) which in particular improves the adhesion of the following selective function layer 5. The following selective function layer 5 consists of silver and is covered with another interface layer 6, namely the second interface layer made of the same material as the first interface layer 4. The second interface layer 6 is in turn covered by a second blocking layer 7 which is also made of substoichiometric $NiCrO_x$, like the first blocking layer 3. As an alternative, the second interface layer 6 may also be omitted.

The third interface layer 8 which follows the second blocking layer 7 in the exemplary embodiment and consists of stoichiometric tin oxide ($SnO_2$) in the exemplary embodiment is optional. In the exemplary embodiment this third interface layer 8 was inserted to improve the mechanical stability, i.e., the abrasion resistance of the system by reducing layer stresses which occur in particular with silicon nitride.

This layer sequence 11 which is deposited above the first dielectric layer 1 having a low to moderate refractive index, wherein this is a low-E layer sequence in the exemplary embodiment, is covered by a traditional top layer which serves in particular as the reflection reducing layer and is made of a highly refractive dielectric material 9 that contains silicon, namely $Si_3N_4$ in the present exemplary embodiment.

The top layer covering the inventive layer system is the second dielectric layer 10 having a low to moderate refractive index. Like the first dielectric layer, this dielectric layer also consists of substoichiometric silicon oxynitride, but with a different oxygen and nitrogen content ($SiO_vN_w$). It is possible that the oxygen and nitrogen content or the oxygen or the nitrogen content of the first dielectric layer 1 having a low to moderate refractive index differs from the oxygen and/or nitrogen content of the second dielectric layer 10 having a low to moderate refractive index. In the exemplary embodiment the oxygen content "v" is lower in comparison with that of the first dielectric layer 1, i.e., "x" having a low to moderate refractive index.

Such a layer system is manufactured in a known way in a coating installation having a plurality of coating stations that follow one another and where the individual layers are deposited one after the other by suitable vacuum coating processes, namely in the present case by medium frequency (MF) sputtering, onto a planar cleaned substrate S from a metallic or semimetallic coating source in the presence of an inert gas such as argon and in the case of layers containing oxygen or nitrogen with the additional presence of oxygen or nitrogen as a reactive gas.

To produce one or more of the dielectric layers 1, 10, 2, 9 that have a layer composition that changes continuously and have a low to moderate refractive index or a high refractive index or to produce the blocking layers 3, 7 as gradient layers, the layers are deposited in the corresponding coating station (s) by means of a spatial arrangement of one or more coating sources using a different material or the same material and using a different gas inlet into the coating station.

We claim:

1. Infrared radiation reflecting transparent layer system on a transparent substrate, comprising an infrared radiation reflecting layer sequence consisting of, as seen from the substrate upward,
   a. a first transparent dielectric layer of an oxynitride of a metal, a semiconductor or a semiconductor alloy having a low to moderate refractive index;
   b. a second transparent dielectric layer having a high refractive index;
   c. a blocking layer;
   d. a first interface layer;
   e. a selective function layer;
   f. an optionally present second interface layer;
   g. a second blocking layer;
   h. an optionally present third interface layer;
   i. a third transparent dielectric layer having a high refractive index and containing silicon; and
   j. an optionally present fourth transparent dielectric layer of an oxynitride of a metal, a semiconductor or a semiconductor alloy having a low to moderate refractive index.

2. The infrared radiation reflecting transparent layer system according to claim 1, wherein the refractive index of said first dielectric layer having a low to moderate refractive index is approximately equal to or slightly greater than the refractive index of the substrate.

3. The infrared radiation reflecting transparent layer system according to claim 2, wherein the refractive index of said first dielectric layer having a low to moderate refractive index is in the range between 1.50 and 1.85 at a main wavelength of visible light of approximately 550 nm.

4. The infrared radiation reflecting transparent layer system according to claim 1, wherein the refractive index of said fourth dielectric layer having a low to moderate refractive index is between 1.50 and 1.95 at a main wavelength of visible light of approximately 550 nm.

5. The infrared radiation reflecting transparent layer system according to claim 1, wherein said first and fourth dielectric layers having a low to moderate refractive index have approximately the same refractive index.

6. The infrared radiation reflecting transparent layer system according to claim 1, wherein the refractive index of at least one of said second and third highly refractive dielectric layers amounts to approximately 1.9 to 2.6 with light of a wavelength of 550 nm.

7. The infrared radiation reflecting transparent layer system according to claim 1, wherein an oxynitride of silicon is deposited as at least one of said first and fourth dielectric layers having a low to moderate refractive index.

8. The infrared radiation reflecting transparent layer system according to claim 7, wherein said first dielectric layer having a low to moderate refractive index is deposited with an oxygen and nitrogen content that differs from the oxygen and nitrogen content of said fourth dielectric layer having a low to moderate refractive index.

9. The infrared radiation reflecting transparent layer system according to claim 1, wherein at least one of said first and fourth dielectric layers having a low to moderate refractive index is applied by chemical vapor deposition methods (CVD methods) or plasma-supported CVD processes.

10. The infrared radiation reflecting transparent layer system according to claim 1, wherein at least one of said first and fourth dielectric layers having a low to moderate refractive index is applied by reactive magnetron sputtering of silicon or silicon-aluminum alloys in an atmosphere containing at least one of the gases oxygen and nitrogen.

11. The infrared radiation reflecting transparent layer system according to claim 1, wherein at least one of said first and fourth dielectric layers having a low to moderate refractive index is deposited as a gradient layer with an oxygen and nitrogen content that decreases toward the function layer.

12. The infrared radiation reflecting transparent layer system according to claim 1, wherein a transparent second dielectric layer of an oxide or nitride of a metal, a semiconductor or a semiconductor alloy having a high refractive index is deposited directly as a bottom layer of said layer sequence on said first dielectric layer having a low to moderate refractive index.

13. The infrared radiation reflecting transparent layer system according to claim 1 wherein said layer sequence consists of:
   a. silicon oxynitride;
   b. titanium oxide;
   c. nickel chromium oxide;
   d. zinc aluminum oxide;
   e. silver;
   f. optionally present zinc aluminum oxide;
   g. nickel chromium oxide;
   h. optionally present stannic oxide; and
   i. silicon nitride.

14. The infrared radiation reflecting transparent layer system according to claim 1 wherein said layer sequence consists of:
   a. silicon oxynitride;
   b. titanium oxide;
   c. nickel chromium oxide;
   d. zinc aluminum oxide;
   e. silver;
   f. optionally present zinc aluminum oxide;
   g. nickel chromium oxide;
   h. optionally present stannic oxide;
   i. silicon nitride; and
   j. silicon oxynitride.

15. The infrared radiation reflecting transparent layer system according to claim 1 wherein said first and fourth dielectric layers having a low to moderate refractive index are made of the same material.

16. The infrared radiation reflecting transparent layer system according to claim 1, wherein the optical thickness of said first dielectric layer having a low to moderate refractive index is less than one-eighth of the wavelength of the spectral range of said transparent layer system for which said layer system has the best transparency.

17. The infrared radiation reflecting transparent layer system according to claim 1, wherein said first dielectric layer having a low to moderate refractive index comprises a gradient layer having an oxygen and nitrogen content that declines in a direction of the function layer.

18. The infrared radiation reflecting transparent layer system according to claim 1, wherein said fourth dielectric layer having a low to moderate refractive index comprises a gradient layer having a declining oxygen content in a direction of the function layer.

* * * * *

UNITED STATES PATENT AND TRADEMARK OFFICE
CERTIFICATE OF CORRECTION

PATENT NO. : 8,377,578 B2  
APPLICATION NO. : 13/349007  
DATED : February 19, 2013  
INVENTOR(S) : Koeckert et al.

Page 1 of 1

It is certified that error appears in the above-identified patent and that said Letters Patent is hereby corrected as shown below:

Title Page in the Related U.S. Application Data item (62): Delete "filed on May 17, 2005" and insert -- filed on May 17, 2007 --

Signed and Sealed this  
Twenty-third Day of April, 2013

Teresa Stanek Rea  
*Acting Director of the United States Patent and Trademark Office*